(12) United States Patent
Ticehurst

(10) Patent No.: US 10,296,503 B2
(45) Date of Patent: May 21, 2019

(54) SYSTEM AND METHOD FOR EFFICIENT DATABASE TRANSACTIONS

(71) Applicant: John L Ticehurst, Rhodes (AU)

(72) Inventor: John L Ticehurst, Rhodes (AU)

(73) Assignee: Unisys Corporation, Blue Bell, PA (US)

( * ) Notice: Subject to any disclaimer, the term of this patent is extended or adjusted under 35 U.S.C. 154(b) by 602 days.

(21) Appl. No.: 14/827,761

(22) Filed: Aug. 17, 2015

(65) Prior Publication Data

US 2017/0052998 A1 Feb. 23, 2017

(51) Int. Cl.
*G06F 17/30* (2006.01)
*G06F 16/23* (2019.01)
*G06F 16/25* (2019.01)

(52) U.S. Cl.
CPC ........ *G06F 16/2379* (2019.01); *G06F 16/258* (2019.01)

(58) Field of Classification Search
CPC ......... G06F 17/30377; G06F 17/30569; G06F 16/2379; G06F 16/258
See application file for complete search history.

(56) References Cited

U.S. PATENT DOCUMENTS

| | | | | |
|---|---|---|---|---|
| 2002/0055944 A1* | 5/2002 | Dyer | ................ | G06F 17/30575 |
| 2002/0111935 A1* | 8/2002 | Jones | ................ | G06F 17/30398 |
| 2003/0217081 A1* | 11/2003 | White | ................ | G06F 12/0813 |
| 2004/0088204 A1* | 5/2004 | Plum | ..................... | G06Q 10/02 705/5 |
| 2006/0282618 A1* | 12/2006 | Thompson | .......... | G06F 12/0804 711/118 |
| 2010/0281004 A1* | 11/2010 | Kapoor | ............. | G06F 16/24561 707/693 |
| 2013/0205028 A1* | 8/2013 | Crockett | ............... | G06F 9/5027 709/226 |
| 2014/0172705 A1* | 6/2014 | Duke | ................. | G06Q 20/4016 705/44 |
| 2014/0310470 A1* | 10/2014 | Rash | ................... | G06F 12/0862 711/126 |
| 2015/0371293 A1* | 12/2015 | Moore | ................... | G06Q 30/04 705/34 |
| 2016/0217401 A1* | 7/2016 | Leung | ............. | G06Q 10/06311 |
| 2016/0259834 A1* | 9/2016 | Bishop | ............. | G06F 17/30575 |

OTHER PUBLICATIONS

Markku Laine, Client-Side Storage in Web Applications, 2012, pp. 1-14 (Year: 2012).*
Mike Ebbers et al, Co-locating Transactional and Data Warehouse Workloads on System z, Nov. 2010, pp. 1-540 (Year: 2010).*

* cited by examiner

*Primary Examiner* — Jared M Bibbee

(57) ABSTRACT

A system and method for processing database transactions wherein the need for a DBMS server to convert data provided by the client from a text format to the raw storage format of the database is eliminated, thereby increasing the efficiency of the DBMS.

24 Claims, 2 Drawing Sheets

SYSTEM AND METHOD FOR EFFICIENT DATABASE TRANSACTIONS

BACKGROUND

A database is an organized collection of data that can be used by client devices for many different purposes. The usage of a database is typically managed by a database management system (DBMS) having servers (DBMS servers) that maintain the database and manage interactions with and transactions requested by client devices. Basically, software on the client device interacts with software on the DBMS server through a communications network to initiate and execute a transaction. The transactions are guided by a set of routines, protocols and toots defined by an application-programming interface (API).

In a traditional DBMS, when a client device wants to access a database, it will formulate a query or request for information access to the database. In response to the request, at least one statement will be generated that, when executed by the DBMS server, satisfy the request. Examples of statements include INSERT, COPY, and UPDATE, which insert data into the database, copy data within the database, and update data within the database, respectively. In the event that the client device has data (client data) that it wants to insert into the database or update data within the database, once the statement is generated, the client device can call an API and provide the client data to the DBMS server that will execute the statement.

The client data is typically communicated from the client device to the DBMS server in any one of a number of text formats including, for example, JavaScript Object Notation (JSON) and Extensible Markup Language (XML). However, data is not typically stored in the database in a text format. The format in which data is stored in a database, referred to herein as the raw storage format, is typically proprietary and thus different for different databases. As a result, when the DBMS server receives the client data, it typically needs to convert the data from a text format to the raw storage format of the database.

To illustrate, a client device that wants to update a record in a relational database may form a request that includes a statement that looks like INSERT INTO TABLEA (col1='A', Colb=10). In this statement, the client data (col1='A', Colb=10) is in a text format. However, the raw storage format of the database could look something like '00101 A02002010.' As a result, in order to execute the INSERT statement, the DBMS server needs to convert the text-based data (provided by the client device) to the appropriate raw storage format of the database.

It can therefore be understood that in a traditional DBMS, the DBMS servers need to essentially perform such conversions (text format to raw storage format) for each database request from every client device using the database. As the number of client devices accessing the database and the number of database transactions gets large, the conversions can require a substantial amount of server computing power and, as a result, DBMS performance can suffer.

SUMMARY

It is to be understood that both the following summary and the following detailed description are exemplary and explanatory only and are not restrictive, as claimed. In one aspect, provided are methods and systems for database transactions between a client device and a database wherein the client device provides client data to the DBMS server in the raw storage format of the database, thereby eliminating the need for a DBMS server to convert the data from a text format to the raw storage format of the database.

In an aspect, a system for processing database transactions can comprise a client device configured to create an in-memory record for data it intends to use in a transaction with a remote database, wherein the in-memory record is in the raw storage format of the target record in the database.

In another aspect, a client device comprises means for creating a plurality of in-memory records for data to be used in transactions with a plurality of databases, wherein each in-memory record is in the raw storage format of the target database for the data.

In another aspect, a system for processing database transactions can comprise a DBMS server configured to process database access requests from remote client devices, wherein the data received from the remote client devices is in the raw storage format of the target database.

Additional embodiments and advantages will be set forth in part in the description which follows or may be learned by practice. The advantages will be realized and attained by means of the elements and combinations particularly pointed out in the appended claims. It is to be understood that both the foregoing general description and the following detailed description are exemplary and explanatory only and are not restrictive, as claimed.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION

Figure 1:
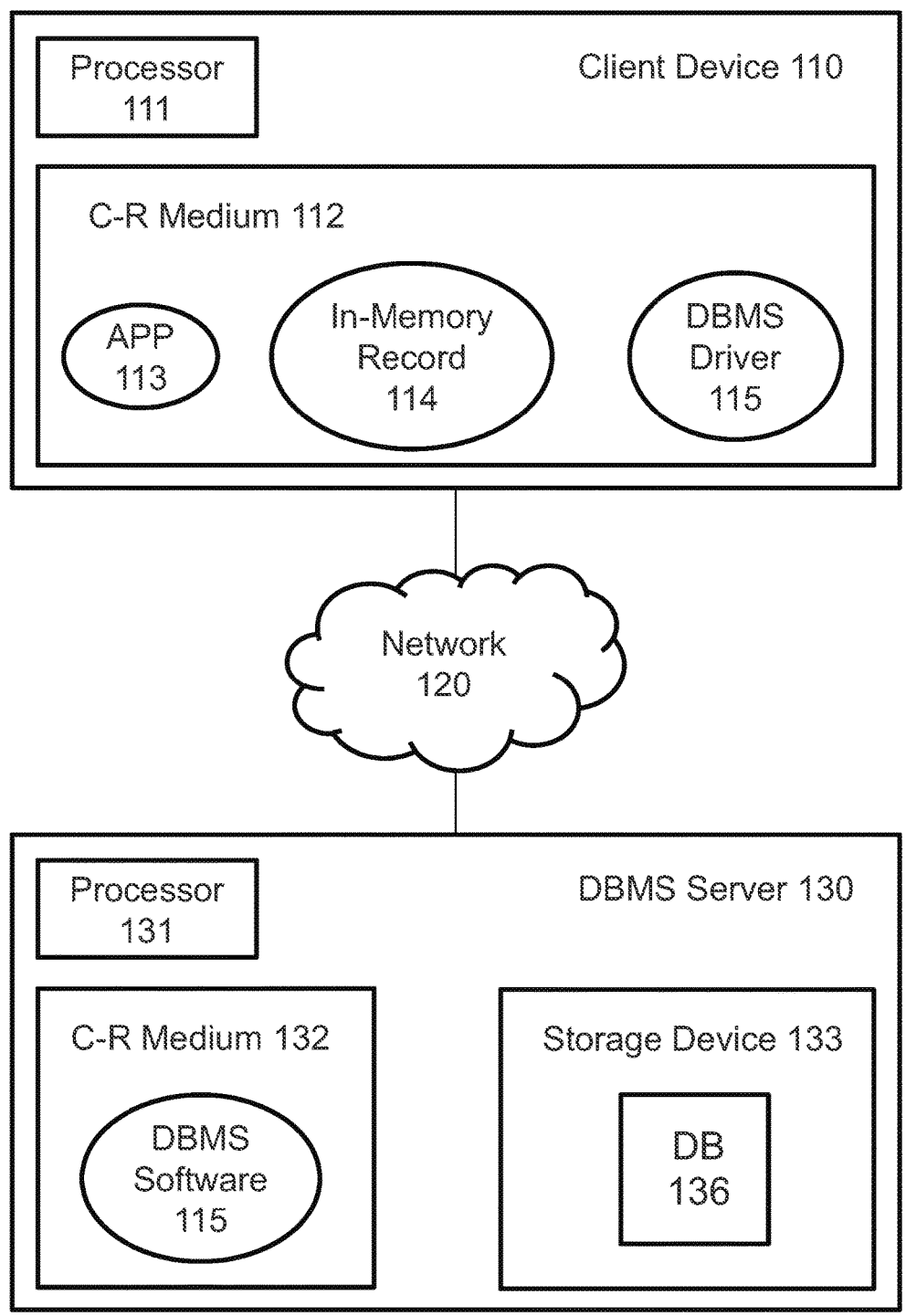
FIG. 1 is a block diagram of an exemplary DBMS.

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise. Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes. In addition, this disclosure uses certain terms relating to exemplary database management systems for convenience. For example, the terms "server", "client device", "record", "request", "transaction", and "raw storage format" are used herein for convenience, and are not intended to limit the scope of the disclosure to a particular database management systems or format.

Disclosed are components that can be used to perform the described methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. The present methods and systems may also take the form of web-implemented computer software. Any suitable computer-readable storage medium may be utilized including hard disks, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

As described in the background section, a client device can interact with a DBMS server to access a database maintained by the DBMS server. The DBMS server basically exposes application-programming interfaces (APIs) that the client device can call to access the database. A query or request to access the database is formulated and planned, and a statement is executed to effectuate the request.

When a client device wants to add or update data within the database, the statement could be, for example, an INSERT statement or an UPDATE statement. In order to execute such a statement, the DBMS server needs the client device to send the client data to be added to or used to update the database. As noted in the background, the client device typically provides the client data in a text-based format such as, for example, JavaScript Object Notation (JSON) or Extensible Markup Language (XML). As a result, in order to execute the statement and complete the transaction, the DBMS server needs to convert the client data from text format to the format of the record in the database. In this specification, the format of the data stored in the database is referred to as the raw storage format, and the format of a record in a database is referred to herein as the raw record format. The raw storage format and raw record format are typically proprietary for each DBMS system.

Thus, in a traditional DBMS, the DBMS server typically needs to convert the text-based data provided by the client device to the appropriate raw storage format or raw record format of the database. As the number of DBMS transactions gets large, the DBMS server will need to use a greater amount of computing power to process such conversions, thereby potentially degrading DBMS performance. Techniques disclosed herein may alleviate this and other shortcomings associated with a traditional DBMS.

FIG. 1 illustrates various aspects of an exemplary network and system in which the present methods and systems can operate. FIG. 1 shows an example DBMS 100. The DBMS 100 includes a DBMS server 130 and at least one client device 110 communicatively connected to one another over a network 120.

DBMS server 130 includes at least a processor 131, a computer-readable medium 132, and a storage device 133. Storage device 133 stores a database 134. Similarly, client device 110 includes at least a processor 111 and a computer-readable medium 112. DBMS sever 130 and client device 110 can each be implemented as one or more computing devices and each typically includes other hardware as well.

Computer-readable medium 132 of DBMS server 130 stores DBMS software 135 that processor 131 executes from computer-readable medium 132 to manage and maintain database 136. DBMS software 135 is operable to store data in database 136 in a raw storage format.

Computer-readable medium 112 of client device 110 stores at least one application program 113 and at least one DBMS driver 115 that processor 111 executes from computer-readable medium 112 to conduct transactions with database 136. Computer-readable medium 112 of client device 110 also stores at least one in-memory record 114. The In-memory record 114 contains data that client device 110 intends to use in a transaction with at least database 136. Such data in the in-memory record 114, in accordance with the present invention, is stored in the raw storage format of database 136. Essentially, DBMS driver 115 can field requests from application program 113 and interact with DBMS software 135 on DBMS sever 130 to effectuate a transaction with database 136 involving client data stored in the in-memory record 114.

In operation, in accordance with the techniques disclosed herein, application program 113 can generate a request for a transaction with the database 136. The DBMS driver 115 and DBMS software 135 formulate a plan to satisfy the request. In accordance with this plan, the DBMS driver 115 and/or the DBMS software 135 prepare at least one statement that, when executed by the DBMS software 135 in relation to database 136, satisfy the request. Exemplary statements include INSERT and UPDATE, which direct DBMS Software 135 to insert data into database 136, and update data within database 136, respectively. Once the at least one statement is generated, the application program 113 can call an API to provide the client data from the in-memory record 114 to the DBMS server 130. Once received, the DBMS software 135 can execute the statement.

Since the client data is provided to DBMS server 130 in the raw storage format of database 136, the DBMS software 135 does not need to convert the data from one format (for example, a text format) to the raw storage format of database 136. Instead, DBMS software 135 can directly store the client data, as received. This reduces the processing power need to process each transaction with the database 136, thereby increasing the efficiency of DBMS server 130 for each transaction and DBMS 100 as well.

Although DBMS 100 of FIG. 1 shows a client device 110 operable to access a single database 136, the invention is not limited as such. It is contemplated that, in accordance with the present invention, client device 101 can access and engage in transactions with a plurality of databases. In such a case, client device 110 would include application software and DBMS drivers for engaging in transaction with each target database. Further, client device 110 would be operable to create in-memory records for the client data it intends to use in each transaction with each target database, wherein the client data is stored in the in-memory record in the raw storage format of the respective target database.

Similarly, although the DBMS 100 shows a DBMS server 130 for processing transactions with a single client device 110, the invention is not limited as such. It is contemplated that, in accordance with the invention, DBMS server 130 can process transactions with a plurality of client devices. As such, the DBMS software 135 would be operable to respond to requests (e.g., formulate plans, generate statements, expose APIs, receive client data, and execute statements) with each client device.

Figure 2:
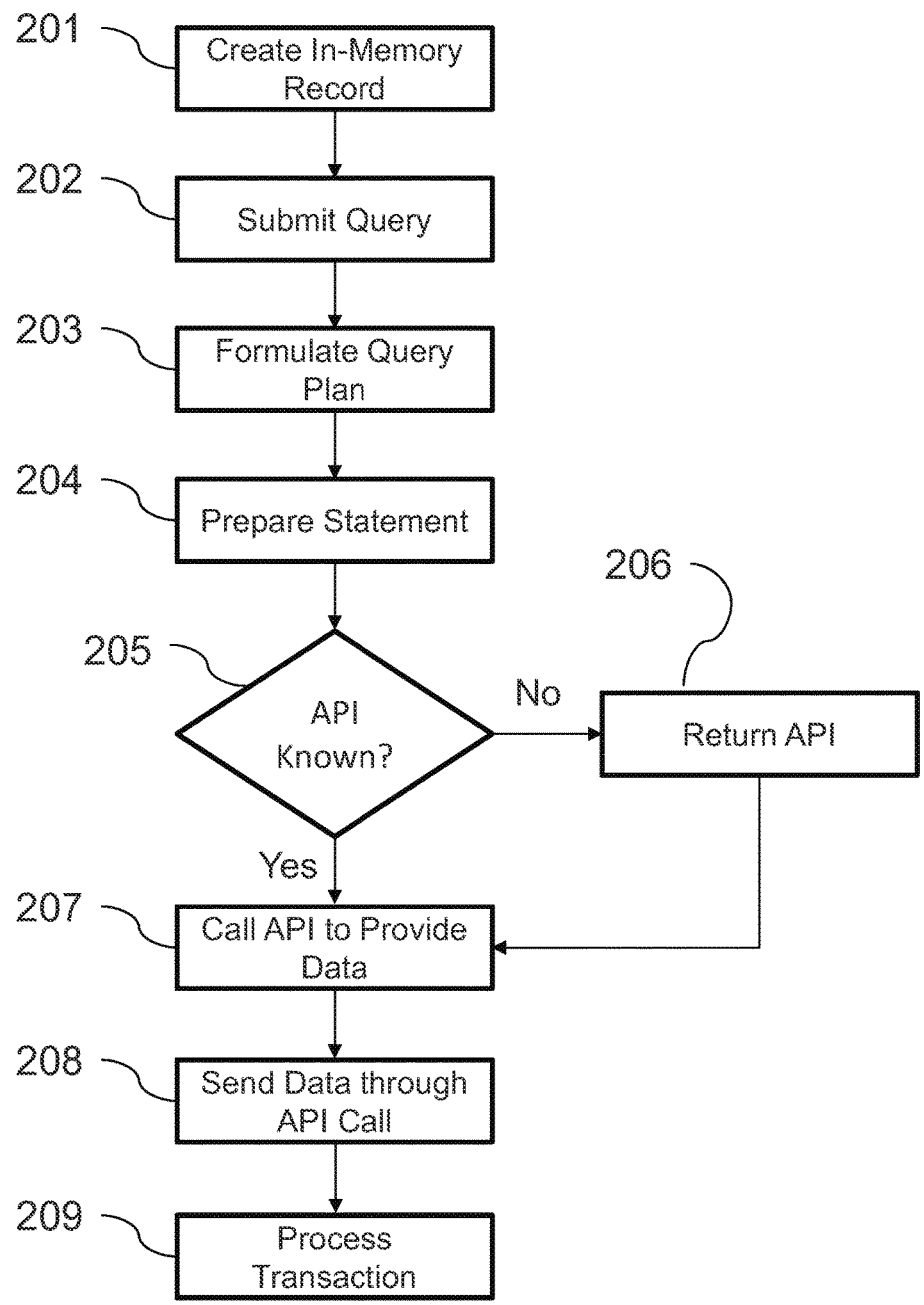
FIG. 2 is a flow chart of an exemplary method for processing database transactions for the DBMS of FIG. 1.

FIG. 2 shows an example method 200 of DBMS 100. In method 200, at step 201, the application program 113 creates an in-memory record 114 for data it intends to use in a transaction with database 136. At step 202, the application program 113 submits a query to DBMS driver 115 to access the database 136. The query could be, for example, to update a record in the database 136 or to add data within the database 136. At step 203, DBMS driver 115 formulates a plan with the DBMS software 135 to process the transaction. As part of this plan, at step 204, DBMS driver 115 prepares at least one statement to be executed by DBMS software 135. At step 205, application program 113 checks to see if it knows the API for the transaction. If not, at step 206, the API is returned to application program 113 by either the DBMS driver 115 or by the DBMS software 135. At step 207, the application program 113 calls the API to provide the client data from in-memory record 114 to DBMS software 135. At step 208, the DBMS driver 115 passes the client data from the in-memory record 114 to the DBMS server 130 through the API call. Since the client data stored in the in-memory record 114 is in the raw storage format of the database 136, the client data is provided to the DBMS server 130 in the raw storage format of database 136. At step 209, the transaction is processed by DBMS software 135 in accordance with the statement generated by DBMS driver 115, at step 204.

Since the client data is provided by client device 110 to DBMS server 130 in the raw storage format of database 136, DBMS software 135 can execute the statement without having to convert the client data from one format (e.g., text format) to the raw storage format of database 136. Instead, DBMS software 135 can store the received data directly into database 136, as received. This reduces the processing power needed to process each transaction with the database 136, thereby increasing the efficiency of DBMS server 130 for each transaction and DBMS 100 as well.

It will be apparent to those skilled in the art that various modifications and variations can be made without departing from the scope or spirit of the present disclosure. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A computer implemented method of processing a transaction from a remote client device with a database stored within a database server containing data stored in a raw storage format, the database server having a processor, computer-readable storage medium maintaining database management software, and a storage device for maintaining the database, the method comprising the steps of:
   receiving a request from the remote client device to access the database stored within the database server;
   generating at least one statement based on the request, the at least one statement comprising a command for execution by the database server;
   receiving client data related to the transaction from an in-memory record created by and stored on the remote client device, the in-memory record storing the client data in the raw storage format of the database such that the client data received is in the raw storage format of the database; and
   executing by the database server the at least one statement using the client data as received.

2. The computer implemented method according to claim 1, wherein the request comprises a request to update the database.

3. The computer implemented method according to claim 2, wherein the at least one statement comprises an UPDATE statement.

4. The computer implemented method according to claim 1, wherein the request comprises a request to insert data into the database.

5. The computer implemented method according to claim 4, wherein the at least one statement comprises an INSERT statement.

6. The computer implemented method according to claim 1, further comprising the step of exposing an API to the remote client device, wherein the API enables the remote client device to send the client data to the database server in the raw storage format of the database.

7. The computer implemented method according to claim 1, wherein the remote client device comprises an application for requesting and utilizing database data and a database driver for communicating with the database server in the raw storage format.

8. A computer implemented method of processing transactions with a database stored within a database server containing data stored in a raw storage format, the database server having a processor, computer-readable storage medium maintaining database management software, and a storage device for maintaining the database, the method comprising the steps of:
   receiving a request from a remote client device to execute a transaction with the database, the request comprising a statement defining a type of the transaction and providing client data related to the request, wherein the client data is provided from an in-memory record created by and stored on the remote client device, the in-memory record storing the client data in the raw storage format of the database such that the client data provided is in the raw storage format of the database; and
   executing the transaction in accordance with the statement.

9. The computer implemented method according to claim 8, wherein the statement comprises an INSERT transaction.

10. The computer implemented method according to claim 8, wherein the raw storage format comprises a raw record format.

11. The computer implemented method according to claim 8, wherein the statement comprises an INSERT transaction for a record in the database, and wherein the raw storage format comprises a raw record format for the database.

12. The computer implemented method according to claim 8, wherein the statement comprises an UPDATE transaction.

13. A computer implemented method performed by a remote client device for accessing a database stored within a database server containing data stored in a raw storage format, the database server having a processor, computer-readable storage medium maintaining database management software, and a storage device for maintaining the database, the method comprising the steps of:
   creating an in-memory record of client data related to a transaction of the remote client device with the database for storage on the remote client device, the in-memory record storing the client data in the raw storage format of the database;
   generating a request to access the database to initiate the transaction;
   formulating at least one statement based on the request, the at least one statement comprising a command for execution by the database server;
   calling an API; and
   sending the client data from the in-memory record of the remote client device to the database server in accordance with the API, the client data being sent in the raw storage format of the database.

14. The computer implemented method according to claim 13, wherein the request comprises a request to update data within the database.

15. The computer implemented method according to claim 14, wherein the at least one statement comprises an UPDATE statement.

16. The computer implemented method according to claim 13, wherein the request comprises a request to insert data into the database.

17. The computer implemented method according to claim 16, wherein the at least one statement comprises an INSERT statement.

18. A computer implemented method performed by a remote client device for accessing a remote database stored within a database server containing data stored in a raw storage format, the database server having a processor, computer-readable storage medium maintaining database management software, and a storage device for maintaining the remote database, the method comprising the steps of:
   creating an in-memory record of client data related to a transaction of the remote client device with the remote database for storage on the remote client device, the in-memory record storing the client data in the raw storage format of the remote database; and
   transmitting a request to the database server electrically connected with the remote database to execute the transaction with the remote database, the request comprising a statement defining a type of the transaction and including the in-memory record of the client data related to the transaction such that the client data is provided to the database server in the raw storage format of the remote database.

19. The computer implemented method according to claim 18, wherein the statement comprises an INSERT statement.

20. The computer implemented method according to claim 18, wherein the raw storage format comprises a raw record format.

21. The computer implemented method according to claim 18, wherein the statement comprises an INSERT transaction for a record in the remote database, and wherein the raw storage format comprises a raw record format for the remote database.

22. The computer implemented method according to claim 18, wherein the statement comprises an UPDATE statement.

23. A database management system comprising:
   a database, the database containing data in a raw storage format; and
   a server electrically connected to the database, the server comprising:
      an interface for receiving a request from a remote client device to execute a transaction with the database; and
      a processor configured to:
         generate at least one statement based on the request, the at least one statement comprising a command for execution by the server;
         receive client data from an in-memory record created by and stored on the remote client device, the in-memory record storing the client data in the raw storage format of the database such that the client data received is in the raw storage format of the database; and
         execute the at least one statement using the client data, as received.

24. The system according to claim 23, wherein the processor is configured to receive the client data by returning an API to the remote client device, wherein the API enables the remote client device to send the client data to the server in the raw storage format of the database.

* * * * *